United States Patent [19]

Akagi

[11] Patent Number: 4,504,039
[45] Date of Patent: Mar. 12, 1985

[54] SOLENOID ACTUATED VALVE DEVICE
[75] Inventor: Motonobu Akagi, Kariya, Japan
[73] Assignee: Aisin Seiki Kabushiki of 1, Kariya, Japan
[21] Appl. No.: 478,584
[22] Filed: Mar. 24, 1983
[30] Foreign Application Priority Data
Mar. 24, 1982 [JP] Japan ................. 57-046512
[51] Int. Cl.³ ............................. F16K 31/08
[52] U.S. Cl. ...................... 251/65; 251/139
[58] Field of Search .............. 251/129, 139, 65; 137/625.3

[56] References Cited
U.S. PATENT DOCUMENTS

| 3,599,673 | 8/1971 | Lucien | 251/65 |
| 3,853,146 | 12/1974 | Blair | 137/625.3 |
| 4,310,143 | 1/1982 | Determan | 251/65 |
| 4,346,736 | 8/1982 | Inada et al. | 251/129 |
| 4,437,645 | 3/1984 | Nomura et al. | 251/65 |

Primary Examiner—Samuel Scott
Assistant Examiner—Noah P. Kamen
Attorney, Agent, or Firm—Sughrue, Mion, Zinn, Macpeak & Seas

[57] ABSTRACT

A solenoid actuated valve device for electrically controlling the flow of fluid includes a body having an inlet port and an outlet port, a hollow core positioned within the body and having first and second axially spaced openings which provide fluid communication between said inlet and outlet ports and a cover member secured to one end of the body so that the core is supported by the body and the cover member for axial adjustment movement relative thereto. A bobbin is slidably mounted on the core and is provided with a valve portion for controlling the effective area of the first and second openings. A solenoid coil is provided for shifting the value in opposite directions. In the absence of electric current to the coil first and second springs maintain the bobbin in a position so that the valve portion thereof is located between the first and second openings in the coil so that one opening will be completely open and the other will be completely closed.

2 Claims, 1 Drawing Figure

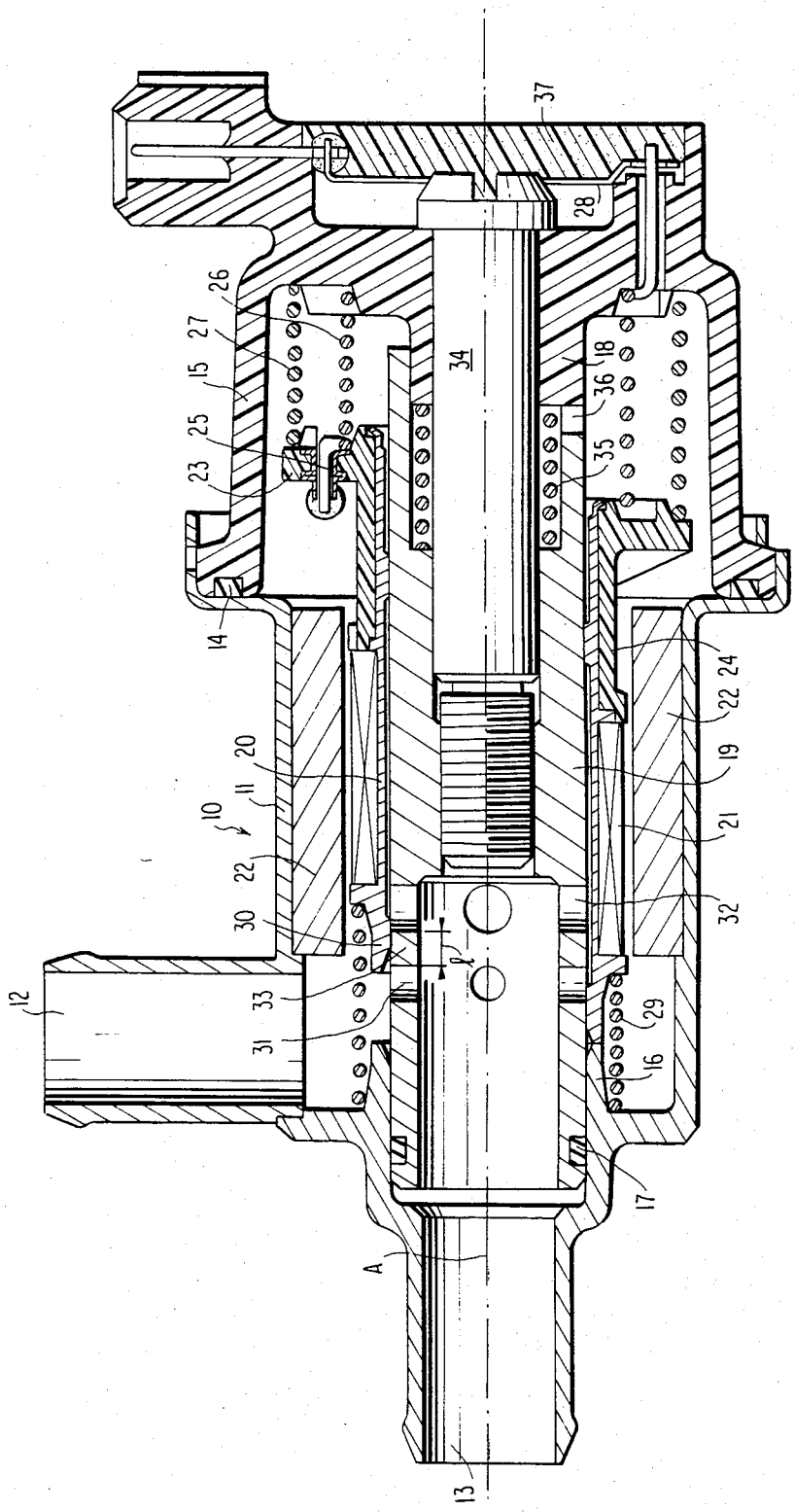

SOLENOID ACTUATED VALVE DEVICE

BACKGROUND OF THE INVENTION

The present invention is directed to a solenoid actuated valve device and more particularly to a solenoid actuated valve device for controlling the flow of a fluid in proportion to the electric current applied to the solenoid.

Conventional solenoid actuated valve devices have been proposed which utilize a linear motor of the moveable coil type and a valve means. The linear motor includes a core, a bobbin slidably mounted on the core, a solenoid coil wound on the bobbin, permanent magnets with the magnetic flux of each magnet intersecting the winding of the solenoid coil at right angles and a yoke or body forming a magnetic circuit with the core. The valve means in general includes a sliding valve member which is slidable with the bobbin on the core in response to the electric current flowing through the solenoid coil to thereby proportionally control openings formed in the core between an inlet port and an outlet port.

In such conventional solenoid actuated valve devices, when the solenoid coil receives no electric current, the sliding valve member is always biased by means of a pair of springs in a direction so that the sliding valve member will completely open or completely close the openings to thereby interrupt or fully establish the fluid communication between the inlet and outlet ports. Therefore, in order to cause the sliding valve to move to the full extent in the opposite direction from which it is normally biased, a large magnetic or exciting force must be generated by the application of electric current to the solenoid coil. This usually means that a large amount of electricity consumption is required.

In order to obviate the above-mentioned drawback, the sliding valve member may be balanced by means of a pair of springs which are positioned on opposite sides of the valve member so that the sliding valve member is normally maintained in a standard position when the solenoid coil is de-energized which corresponds approximately to one-half coverage of the openings of elongated configuration. Thus, the sliding valve member can move in the forward direction from the standard position when the electric current is applied in one direction to the solenoid coil while the sliding valve member can move in the rearward direction from the standard position upon the application of electric current in the opposite direction to the solenoid coil. Accordingly, the electricity consumption may be reduced by half. However, the solenoid actuated device may be applied in an idling control system for vehicles and therefore the sliding valve member may deviate from the standard position due to the vibration of the vehicle. This results in uncontrolled fluctuation in the flow of fluid through the openings when the solenoid coil is de-eneregized.

SUMMARY OF THE INVENTION

The present invention provides a new and improved solenoid actuated valve device which obviates the above-mentioned drawbacks of conventional devices discussed above.

The present invention provides a new and improved solenoid actuated valve device wherein the electricity consumption is substantially reduced.

The present invention provides a new and improved solenoid actuated valve device which assures the desired flow of fluid even when no electric current is supplied.

The present invention provides a new and improved solenoid actuated valve device for electrically controlling the flow of fluid comprising a body having an inlet port and an outlet port, a hollow core positioned within said body and having a first opening means and a second opening means which provide fluid communication between said inlet and outlet ports, a bobbin slidably mounted on said core and having a valve portion for controlling the effective area of said first and second opening means, a solenoid coil wound on said bobbin, permanent magnet means mounted in said body so that the magnetic flux thereof intersects the winding of solenoid coil at right angles, magnetic means forming a magnetic circuit including said permanent magnet means in cooperation with said core so that forces are generated to cause the bobbin to move forwardly and rearwardly when said coil receives electric current flowing in opposite directions respectively, a first spring means biasing said bobbin in one direction and a second spring means biasing said bobbin in the other direction whereby said valve portion is normally maintained in a position covering only one of said first and second opening means when said coil is de-energized.

The foregoing and other objects, features and advantages of the invention will be apparent from the following more particular description of a preferred embodiment of the invention as illustrated in the accompanying drawings.

BRIEF DESCRIPTION OF THE DRAWINGS

The sole drawing FIGURE is a cross-sectional view of a solenoid actuated device according to the present invention wherein the half of the device above the axial line A illustrates the position of the valve when no electric current is involved while the half below the axial line A illustrates the position of the valve when a negative electric current is applied.

DETAILED DESCRIPTION OF THE INVENTION

A solenoid actuated valve device 10 according to the present invention may be utilized in the idle control for an electric fuel injection system for motor vehicles. The solenoid actuated valve device 10 is provided with an inlet port 12 on the body 11 adapted to receive atmospheric air from a point upstream of the throttle valve and an outlet port 13 on the body 11 which is connected to an intake manifold downstream of the throttle valve. Thus, the solenoid actuated valve device 10 controls the flow of atmospheric air into the intake manifold by means of a solenoid actuated valve to thereby control the idle when the engine is first started cold and to control the idle when the engine is warmed up.

A cover 15 is secured to the body 11, by any suitable means and is maintained in sealing engagement therewith by means of a sealing member 14. A hollow core 19 of magnetic material such as steel is mounted for axial movement within the body 11 and the cover 15. The left end portion of the core 19 is supported by an extension 16 of the body 11 and is sealed with respect to the extension by means of a sealing ring 17. The right end portion of the core 19 is supported by the extension 18 on the cover 15. A bobbin 20 of non-magnetic material such as a synthetic resin is slidably mounted on the core 19. A solenoid coil 21 for generating a magnetic force is wound on the bobbin 20. A plurality of permanent magnets 22 are securely supported on the body 11 in equally spaced relation to each other about the bobbin 20 so that the magnetic flux of each of the magnets 22 intersects the winding means of the coil 21 at right angles. Thus, the magnetic circuit for the magnets 22 is formed by means of the core 19 and the body 11 and in this manner a linear motor of the linear coil type is provided. A cylindrical member 24 of insulating material is secured to the right end portion of the bobbin 20 and has a radially extending flange 23 thereon to which both of the lead terminals 25, only one of which is shown in the drawing, of the coil 21 are connected. Both terminals are electrically connected by a pair of springs 26 and 27, respectively, which are in turn connected to outside terminals 28 respectively (only one of which is shown in the drawing) to thereby form a circuit for supplying electric current to the coil 21.

Both of the springs 26 and 27 function to bias the cylindrical member 24 and the bobbin 20 to the left as viewed in the drawing. The bobbin 20 is also biased to the right by means of a spring 29, one end of which is seated against the body 11. Thus, when the solenoid coil 21 is de-energized and receives no electric current, the bobbin 20 may be balanced by means of the springs 26 and 27 and the spring 29 in its normal position as illustrated wherein the valve portion 30 of the bobbin 20 is positioned between the first opening 31 and a second opening 32 in the core 19. Both of the openings 31 and 32 are provided in the core 19 to provide fluid communication between the inlet and outlet ports 12 and 13. More specifically, when no electric current is supplied, the valve portion 30 fully opens only the first opening 31 and is positioned in conjunction with the portion 33 of the core 19 which has no opening and which is located between the first and second openings 31 and 32. The portion 33 of the core 19 has a length l which is of sufficient length so that if the position of the valve portion 30 is changed due to vibrations the valve portion 30 will still be maintained in its original position wherein the valve portion 30 fully opens only the first opening 31.

An adjusting screw member 34 is threaded through the core 19 so that the position of the core 19 can be adjusted in response to the forward and rearward threading movement of the screw member 34. Thus, the positions of the first and second openings 31 and 32 can be properly adjusted relative to the valve portion 30 of the bobbin 20. A spring 35 is inserted between the core 19 and the cover member 15 and functions so as to prevent undue movement of the core 19 relative to the screw member 34 due to vibrations. The rotational movement of the core 19 relative to the cover 15 is prevented by means of a plurality of axially extending projections formed in the extension 18 which mate with the plurality of grooves 36 in the end of the core 19. A sealing member 37 may be secured in the cover 15 to cover the screw 34.

When the solenoid coil 21 receives no electric current, the bobbin 20, having the valve portion 30, is maintained in its original position as shown in the upper portion of the drawing above the axial line A. Therefore, the atmospheric air at the inlet port 12 is transmitted to the outlet port 13 by means of the first opening 31. When the solenoid coil 21 receives a positive electric current the bobbin 20 is moved to the right in proportion to the strength of the electric current whereby the valve portion 30 proportionally opens the second opening means 32 to thereby increase the fluid communication between the inlet and the outlet ports. When the solenoid coil 21 receives a negative electric current, the bobbin 20 is moved to the left in proportion to the strength of the electric current whereby the valve portion 30 proportionally closes the first opening 31 to thereby restrict the fluid communication between the inlet and the outlet ports 12 and 13, respectively. More particularly, the openings 31 and 32 may be formed as elongated holes extending in the axial direction of the core 19 so that the effective areas of the openings are increased or decreased in proportion to the movement of the valve portion 30 on the bobbin 20.

In the above-disclosed solenoid actuated valve device, even when the vehicle engine is stopped, at least the first opening 31 will be maintained in an open position. Therefore, the prescribed flow of fluid may be assured upon starting the engine, even when the bobbin can not move due to freezing.

While the invention has been shown and described with reference to a preferred embodiment thereof, it will be understood by those in the art that various changes in form and detail may be made therein without departing from the spirit and scope of the invention.

What is claimed is:

1. A solenoid actuated valve device for electrically controlling the flow of fluid comprising a body having an inlet port and an outlet port, a hollow core positioned within said body and having a first opening and a second opening for providing fluid communication between said inlet and outlet ports, a bobbin slidably mounted on said core and having a valve portion for controlling the effective area of said first and second openings, a solenoid coil wound on said bobbin, permanent magnet means mounted on said body so that the magnetic flux thereof intersects the windings of said solenoid coil at right angles thereto, magnetic means forming a magnetic circuit including said permanent magnet means in cooperation with said core so that forces are generated to cause said bobbin to move in opposite directions when electric current is applied to said coil in opposite directions, first spring means biasing said bobbin in one direction and second spring means biasing said bobbin in the opposite direction for maintaining said valve portion in a position intermediate said first and second openings in the absence of electric current being supplied to said coil wherein said first and second openings being spaced from each other by a portion of said core having no openings, the length of said portion of said core having no openings being of sufficient length so that in the operational position of said valve portion during the de-engergized condition of said coil said first opening will remain completely open and said second opening will remain completely closed, wherein said core is mounted for axial movement within said body and further comprising means for adjusting the axial position of said core relative to said body so as to accurately locate said prtion of said core between said openings relative to said valve portion on said bobbin when said coil is de-energized.

2. A solenoid actuated valve device as set forth in claim 1 wherein said means for adjusting the position of said core axially relative to said body is comprised of a cover member secured to said body, a threaded screw member extending through said cover member into threaded engagement with said core, means for preventing rotation of said core relative to said cover member and spring means interposed between said core and said cover member to prevent vibrational movement of said core relative to said screw threaded member.

* * * * *